Jan. 24, 1956     E. L. SCHOLL     2,732,020
ELECTROPLATED STRUCTURE ADAPTED FOR USE AS AIRFOIL SECTION
Filed May 4, 1950
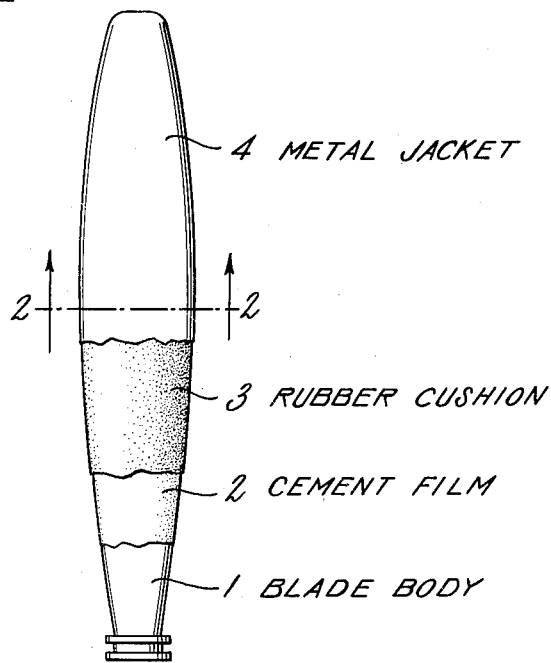
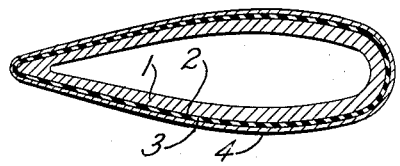
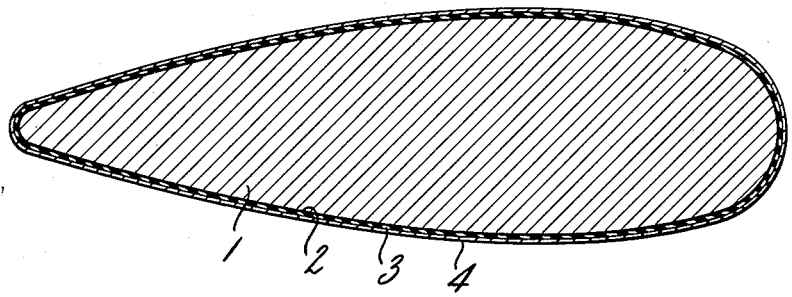
INVENTOR.
ELWOOD L. SCHOLL
BY
Charles E. Willson
ATTORNEY United States Patent Office 2,732,020
Patented Jan. 24, 1956

2,732,020

ELECTROPLATED STRUCTURE ADAPTED FOR USE AS AIRFOIL SECTION

Elwood L. Scholl, Detroit, Mich., assignor to United States Rubber Company, New York, N. Y., a corporation of New Jersey Application May 4, 1950, Serial No. 159,926

1 Claim. (Cl. 170—159)

This invention relates to a structural material for airfoil sections such as an aircraft propeller blade having a slight degree of flexibility along its longitudinal medial plane. In particular, the invention relates to an improved structural section made of a light-weight base of metal, such as an aluminum or hollow steel base, provided with a protective electrodeposited jacket, such as a nickel jacket, and having an intermediate thin, tough film of organic polymeric composition disposed between said base and said protective jacket.

The method disclosed herein for making the improved airfoil sections is claimed in my copending divisional application, Serial No. 298,571, filed July 8, 1952.

Airfoil sections, especially propeller blades, of aircraft are normally subjected to severe service conditions. For this reason it has heretofore been extremely difficult to construct a propeller blade capable of withstanding more than a comparatively limited period of use. Conventional blades, such as aluminum blades, are subjected to rapid erosion, especially on the leading edge, due to particles of water and dust and dirt striking the rapidly revolving blades. This erosion is particularly severe when the aircraft takes off and lands, especially in dusty places. In addition to erosion, there is the equally serious problem of corrosion, which is particularly severe when an aluminum or steel blade is subjected to salt water spray. Also, the rapidly revolving blade is subject to intense dynamic stresses or vibrations, which cause rapidly alternating strains within the blade. This induces the type of failure of the blade known as fatigue failure, that is, cracking of the blade due to the rapidly reversing stresses.

It has been attempted to ameliorate the foregoing difficulties by providing the blade or other airfoil surface with an electrodeposited outer protective jacket of a tough, corrosion-resistant metal. Thus, according to conventional practice, an aluminum blade which has been coated with zinc may be electroplated with nickel. This gives a certain degree of protection from corrosive and erosive influences, but the performance of the blade still leaves much to be desired, particularly from the standpoint of resistance to fatigue failure, since it is observed that cracks form relatively easily in the nickel jacket when the blade is subjected to vibrations and it is also observed that such cracks in the electroplated nickel jacket tend to carry through the zinc to the base of the blade, with consequent failure thereof. Furthermore, a direct electrodeposit on the aluminum tends to separate therefrom in service, due to the dynamic stresses encountered and also due to thermal stresses occasioned by the difference in thermal expansion between the nickel jacket and the aluminum base.

Having in mind the foregoing, it is a primary object of the present invention to provide an improved airfoil section of long life that is resistant to fatigue, as well as to erosion and corrosion, and that is relatively unaffected by extreme temperature changes.

Additional objects and advantages will appear more fully in the following detailed description of the invention when considered in connection with the accompanying drawing, in which:

Fig. 1 is a side view of a composite propeller blade constructed according to the present invention, with part of the various layers thereof shown broken away;

Fig. 2, on a larger scale, is a cross-sectional view of the blade, taken along the line 2—2 of Fig. 1; and Fig. 3 illustrates a cross-sectional view through a hollow propeller blade plated in accordance with the invention.

Referring to the drawing, the composite airfoil section of this invention, in this case a composite propeller blade, is made up of a blade body or core 1 (which may be either solid or hollow), a cement film 2, an intermediate relatively resilient layer 3, and an electrodeposited outer protective metal jacket 4. The blade body 1 is made of suitable metal and may be of conventional construction. It is preferably made of aluminum or other lightweight metal such as magnesium, or alloys of aluminum or magnesium. However, the blade body 1 may also be made of steel if desired, such steel blade preferably being made hollow in order to achieve the desired lightness in weight. The cement film 2 may be any suitable conventional cement capable of forming a strong bond between the metallic base and the cushioning layer 3. The cushioning layer 3 is a tough, flexible film, preferably made of an elastic and resilient rubber composition, whether natural rubber or any of the various synthetic rubbers, such as GR–S, neoprene, Perbunan, polyisobutylene, etc. In place of, or in conjunction with, such rubber compositions, organic plastic materials having suitable resilience and some degree of elasticity, and capable of forming a tough, flexible film may be used. Such materials include, for example, polyvinyl chloride compositions, synthetic linear polyamide compositions, such as nylon, cellulose ester and cellulose ether compositions, polyethylene compositions, etc. Methods of compounding the foregoing organic polymeric materials with plasticizers, reinforcing agents, etc., to yield tough, flexible films are well known to those skilled in the art.

The electrodeposited metallic outer jacket 4 is made of a tough, erosion-resistant and corrosion-resistant metal, preferably nickel. If desired, other electrodeposited metals or alloys such as brass, cadmium, chromium, copper, iron, silver or tin may be used, usually in combination with a final coating of electrodeposited nickel. In general, the preferred material for the jacket 4 is essentially nickel, whether alone or in conjunction with an intermediate electrodeposited layer. In the preferred form of the invention the nickel layer is electrodeposited in a condition of moderate internal expansive stress, as will be explained in more detail below.

The film 3 of rubber or other organic polymeric material must of course be rendered electrically conductive before the nickel jacket can be electrodeposited thereon. If desired, this may be accomplished before the film 3 is deposited on the aluminum blade body by mixing a finely divided conductive substance, such as graphite or powdered metal, with the film-forming composition with which the blade is to be coated. For example, the well known conductive rubber compositions containing acetylene black may be deposited on the blade from a solution or dispersion, and the nickel jacket 4 may be electrodeposited directly on the resulting conductive rubber film. Alternatively, the film 3 may be rendered conductive on its outer surface after it is deposited on the aluminum blade by applying conductive particles to the surface of the film, while such film is in a soft, receptive state, in a manner which will be described in detail below.

The film or layer 3 performs a number of important functions in the present construction. Thus, it is observed that the fatigue resistance of the blade is superior to conventional constructions. Any fatigue cracks which may develop in the outer nickel jacket 4, are prevented by the layer 3 from carrying through to the aluminum base with consequent damage thereto. The improved fatigue resistance is believed to be due to the relatively low elastic modulus of the rubber or resilient plastic layer 3, compared to the aluminum or nickel. Because of such relatively low elastic modulus, the intermediate layer 3 does not conduct vibrations as well as the metallic parts of the blade, with the result that the effect of dynamic stress or vibration of the blade on the nickel jacket is apparently diminished, and vice versa. In other words, vibrations tending to pass from one metal to the other appear to be in a sense interrupted or diminished to a certain extent by the cushioning layer 3. The dampening of vibrations occasioned by the intermediate layer 3 is believed to be responsible in large part for the improved performance of the blades with respect to the effects of dynamic stresses. Furthermore, because of the presence of the intermediate layer 3, there is no metallic continuity between the base and the protective jacket, and as a result it is observed that cracks forming in the surface are not carried through to the base, as in the case when the nickel jacket is directly electrodeposited on the aluminum base, or metal coating upon the base, in accordance with conventional practice so that there is metallic continuity between the base and jacket.

Another important function of the layer 3 is that it acts to relieve stresses occasioned by the difference in thermal expansion of the aluminum base and the nickel jacket. Therefore, the jacket does not tend to separate from the base under the influence of extreme temperature changes.

However, it should be understood that it is not desired to limit the invention to any particular theory of operation concerning the exact mechanism by which the interposed layer 3 of organic polymeric material accomplishes the improvements that have been observed.

In the preferred practice of the invention, the intermediate layer 3 is preferably made of a rubber composition carefully secured to the base 1 with the aid of a cement layer 2, such cement layer preferably being composed of a good rubber-to-metal cement, such as a cement based on a rubber isomer, or cyclo-rubber. Cements of the character disclosed in Canadian Patent 349,491 to Griffith are particularly suitable for this purpose and are commercially available materials, as exemplified by the proprietary cement known as Reanite. Before applying the resilient rubbery layer 3, the surface of the blade body 1 is made chemically clean by any conventional means to remove all dirt, grease, loose oxide, etc., which would prevent formation of a tenaciously adherent bond between the metal body and the rubber layer. There is then applied the rubber bonding film 2, by brushing, dipping or spraying, to form a thin uniform coating. The cement is then dried thoroughly to remove all traces of solvents. Moderate heating may be employed in the drying operation if desired, but the cement, if vulcanizable, should not be heated to the extent that it becomes highly vulcanized and loses its tackiness. The film 2 of rubber adhesive may be extremely thin, say only 0.0001 inch. If desired, an intermediate cement coating (not shown in the drawing) may then be applied, containing both the rubber of the first cement coating 2 and the rubber of the subsequently applied film 3. This intermediate coating improves the bond between the cement layer 2 and the rubber film 3, and also serves to soften the first coating and make it more tacky.

The rubber cushioning layer 3 is now applied to the tacky film previously deposited on the base 1, preferably by deposition from a solvent cement or a dispersion, as by spraying, brushing or dipping. This layer 3 may be composed of an accelerated, vulcanizable rubber compound, usually deposited from a solution containing about 50% of a suitable solvent for the rubber. Natural rubber compounds and neoprene (polychloroprene) rubber compounds are particularly suitable for this purpose, although, as indicated previously, other synthetic rubbers may be used, such as GR–S, butadiene-acrylonitrile copolymers, etc. It is not essential that the rubber compounds be vulcanizable, but some degree of vulcanization of the elastic layer 3 is usually desirable. The amount of vulcanizing ingredients employed in the composition should be relatively small in order to limit the degree of cure obtained upon subsequent heating, so that the rubber layer obtained will have substantial elasticity, tackiness and adhesion. The composition may also contain softeners, antioxidants, fillers, etc. The minimum thickness of this layer is about 0.001 inch, but a somewhat thicker film is usually desirable. If necessary, several coats of rubber solution may be deposited to attain the desired thickness. The resulting rubber layer is unitary and strong.

The deposited cushioning layer 3 is then dried to remove the solvent therefrom. This is preferably done by heating the coating, at the same time effecting a moderate degree of cure if the composition is vulcanizable. The degree of cure is such that the rubber does not lose its elasticity and resilience.

The rubber layer 3 is now ready to be treated preparatory to electrodeposition of the tough outer protective metal jacket 4. For this purpose the outer surface of the rubber film 3 is given a brief treatment with a cyclizing agent to render the outer surface thereof temporarily soft and tacky. A conductive powder, such as graphite or finely powdered metal, is embedded in the outer surface while it is in this temporarily soft condition, and the cyclized surface thereafter becomes hard, thereby bonding the conductive particles firmly within the surface. Consequently, the subsequently electrodeposited metallic jacket 4 adheres so firmly to the conductive particles and rubber layer 3, that the bond therebetween is actually stronger than the rubber itself.

To prepare the rubber layer 3 in this manner, the surface thereof is treated briefly with a conventional cyclizing or resinifying agent, such as chloroacetyl chloride, phosphorous trichloride, bromine, strong sulfuric acid, alkane sulphonic acids, trichloroacetic acid, amphoteric metal halides, such as stannic chloride, titanium chloride, ferric chloride, antimony pentachloride, boron trifluoride, etc. These agents have the common property of reacting on the rubber to reduce the unsaturation thereof, forming cyclic molecular structures, with the result that the rubber becomes hard or resinified, compared to the untreated rubber. However, before the rubber has been so hardened by the cyclizing agent, it passes through a transient softened and tacky stage, and it is in this stage that the conductive powder must be applied to, and thoroughly embedded in, the surface before the jacket 4 is electrodeposited upon the rubber cushion 3. As a result of this procedure, the conductive particles are firmly embedded in the hard resinified surface of the rubber, and the electrodeposited metallic jacket adheres thereto with great strength.

The time of treatment with the cyclizing agent may typically be of about two minutes' duration, such time period being measured immediately after the surface of the rubber has been completely wetted with the cyclizing agent. If the cyclizing agent is not itself a liquid it is preferably employed as a solution, such as an aqueous solution. The time of treatment will vary with the particular cyclizing agent used and will also vary with the concentration of the cyclizing agent and the temperature of the treatment. Although the treatment is most conveniently carried out at room temperature, elevated temperatures may be employed if desired, e. g., 100° F. Under various conditions the time of treatment may vary considerably, for example, from ¼ minute duration to 30 minutes' duration. Since it is desired to cyclize only the surface of the rubber layer 3 in order that the interior thereof may retain its resilience and elastic cushioning properties, the cyclizing agent is thoroughly washed off the surface as soon as the surface has been adequately treated.

The thus-treated surface will remain in a softened tacky condition for a relatively brief period of time, say about 1 hour, before being converted to the final cyclized or hardened state. Within this transient period the conductive powder, preferably graphite, is applied to the surface and thoroughly embedded therein. When the surface becomes hard, it is preferably polished. After these operations, the surface has a permanently hard finish, and in this state it is highly receptive to the subsequently electrodeposited jacket 4, which adheres to the graphite particles that are firmly embedded in the cyclized surface of the rubber. The method of cyclizing a rubber surface to firmly embed conductive particles therein prior to electrodepositing a metal layer on the rubber is claimed in my copending applications Serial No. 704,505, filed October 19, 1946; Serial No. 61,561, filed November 23, 1948; and Serial No. 61,562, filed November 23, 1948, which are now U. S. Patents 2,551,342; 2,551,343; and 2,551,344, respectively, and which are assigned to the same assignee as the present application.

The electrodepositing step may then be carried out by immersing the surface-hardened, graphite-impregnated blade in an electrolytic bath and depositing thereon a tough, erosion-resistant and corrosion-resistant metal, preferably nickel. If desired, an initial electrodeposited coating of brass, cadmium, copper, iron, chromium, tin, etc., may be applied followed by a coating of nickel. It is advantageous to deposit a thicker coating of metal on the edges of the blades than on the sides. For example, a coating of about 0.02 inch thickness may be deposited on the leading and trailing edges of the blade, with a coating 0.01 inch thick on the sides. This metal jacket 4 is preferably provided throughout the entire length of the blade 1.

In the preferred practice of the invention the nickel plating is electrodeposited in a state of moderate positive stress, that is, the plating is deposited so as to tend to be in a condition of moderate expansive stress. Nickel plating of such character may be electrodeposited from plating baths containing an additional agent having stress-relieving properties, such as para-toluene sulfonamide, saccharin, etc. As will be understood by those skilled in the art of electroplating, there are commercially available preparations, exemplified by Udylite Brightener No. 3 (believed to be comprised of about ⅙ para-toluene sulfonamide, ⅙ saccharin, and ⅔ boric acid as a carrier), containing such addition agents, for the purpose of relieving stresses in the electrodeposit. The most preferred nickel plates are those deposited with an internal expansive stress of about +5,000 pounds per square inch, and usually within the range of from +1,000 to +10,000 pounds per square inch. The internal stress of the nickel can be measured by conventional methods, such as that described in the Proceedings of the 34th Session of the American Electroplaters Society, p. 47, 1947, in the article "Stress in electrodeposits—its significance," by Soderberg and Graham. Nickel jackets of this character in certain instances display superior resistance to fatigue failure, corrosion, and erosion.

In the event that the intermediate layer 3 is of such nature that it adheres well to aluminum, the cement layer 2 may be dispensed with if desired. However, when the intermediate layer 3 is made of a rubber composition, the cement layer 2 is highly desirable.

The following example will illustrate the invention in more detail.

Example

An aluminum propeller blade body is thoroughly degreased by rinsing with a solvent. The blade is dried, and dipped in a cement having a base of isomerized rubber. The resulting adhesive coating is allowed to dry. The blade is then dipped in a solution of the following rubber stock to build up a rubber cushioning layer over the adhesive coating:

| | Parts by weight |
|---|---|
| Rubbery chloroprene polymer | 100.0 |
| Zinc oxide | 5.0 |
| Magnesium oxide | 4.0 |
| Antioxidant | 2.5 |
| Carbon black | 80.0 |
| Benzothiazyl disulfide | 1.0 |
| Plasticizer | 2.5 |

This stock is dissolved in sufficient petroleum oil solvent (B. P. 205–274° F., sp. gr. 0.835) to make a solution having a viscosity of 17 seconds at room temperature in a Saybolt cup viscometer having a 0.156 inch orifice. A cushioning layer about 0.001 inch thick is deposited on the blades from this solution. This rubber layer is dried and given a slight cure by exposure to infra-red lamps for about 1 hour at a temperature of 160° F. There is then brushed on this rubber layer a cyclizing agent comprising a mixture of alkane sulfonic acids, containing about 90% sulfonic acids, mainly methane sulfonic acid, ethane sulfonic acid and propane sulfonic acid, and having a specific gravity of 1.25 to 1.35. This acid is permitted to remain on the rubber surface for a period of about 2 minutes after the surface has been completely wetted. The acid is then washed off with cold water and the rubber surface is dried by blowing air over it. The thus-treated surface is soft. Finely powdered graphite is dusted on the soft receptive surface and is firmly embedded therein. The treated rubber surface becomes hard or resinified, due to cyclization. An outer nickel jacket is then electrodeposited thereon from the following bath:

| | Oz. per gal. |
|---|---|
| Nickel sulfate ($NiSO_4.6H_2O$) | 44 |
| Nickel chloride ($NiCl_2.6H_2O$) | 4 |
| Boric acid | 4 to 5 |
| Wetting agent | 0.05 |
| Para-toluene sulfonamide | 0.083 |

The pH of the bath is adjusted to a value within the range from 2.5 to 3. The operating temperature of such bath is usually about 140° F., and the current density employed is usually about 25 amperes per square foot. Such a bath yields upon electrolysis a very hard, semi-bright deposit with a low internal stress. The plating is corrosion-resistant, non-laminar in structure, and cohesively sound.

A propeller blade constructed in accordance with the present invention was tested for resistance to abrasion and corrosion by revolving the blade at high speed while directing a high velocity stream of water across the path of the blade, near its outer end. The nickel jacketed blade of this invention shows no sign of erosion, splitting, pitting or other adverse effects, even after being subjected to this severe test for 50 hours. The speed of the tip of the blade was about 500 feet per second during the test. In contrast to this, a conventional unprotected aluminum blade was eroded beyond usefulness after only two hours of similar testing. Similarly, an aluminum blade directly plated with nickel by a conventional process, was hardly any better than the unplated aluminum blade, and lasted only several hours in the test.

When the improved blade of the present invention is subjected to a vibration test, or fatigue test, it is observed that if cracks develop in either the base layer or the electrodeposited layer as a result of the vibrations, they are prevented by the interposed film from carrying through from one component layer of the blade to the other. In a conventional blade having a nickel jacket directly electrodeposited on the aluminum base, such cracks travel through to the base to destroy the blade. Also, cracks are more readily initiated on the conventional blade than on the blade of this invention.

The improved blade can be revolved at high speed at −72° F. with no evidence of separation of the jacket from the base, and with no apparent detrimental results. Similarly, elevated temperatures, e. g. 140° F., have no detrimental effect on the blade.

From the foregoing, it is evident that the invention provides an improved propeller blade highly resistant to the deteriorating influences encountered in service, with consequently increased service life, compared to blades of conventional construction. Furthermore, the electrodeposited metallic jacket can be renewed easily when necessary by stripping off the worn jacket and rubber cushion and applying a new rubber layer and jacket over the aluminum blade in the manner previously described, so that the ultimate total life of the blade is greatly increased. Because the nickel jacket and the intermediate layer are relatively thin, it is seen that the thickness of the blade is not substantially increased by applying the cushioning layer and protective jacket. The advantage of this is that propeller blades now in use can be protected in the manner of this invention without affecting the airfoil contours so that no special designing of the blade to accommodate the applied coating is necessary.

The improved composite propeller blade is not adversely affected by the wide temperature extremes to which propeller blades are subjected in service. Thus, neoprene rubber compounds, or other specially compounded rubber compositions, may be employed in the cushioning layer to give good service at extremely low temperatures, as well as at temperatures as high as 140° F. Because the bond between the rubber and the electrodeposited metallic jacket is strong and tight, there is no danger of moisture getting in between these layers to freeze and expand causing loosening of the jacket.

While the invention has been described with particular reference to aircraft propellers, it will be understood that the invention is not limited to propellers, but may be applied advantageously in constructing other airfoil surfaces, such as the edges of wings, rudders, elevators, struts, etc. In all cases, the base of the improved airfoil section is made of suitable structurally strong metal, protected with a layer or jacket composed essentially of a corrosion-resistant and erosion-resistant metal electrodeposited on an interposed film of organic polymeric material firmly adhered to said base in the manner described.

Having thus described my invention, what I claim and desire to protect by Letters Patent is:

A substantially rigid aeroplane propeller blade having a slight degree of flexibility along its longitudinal medial plane, said blade including an inner, preformed, relatively rigid core of metal functioning to give configuration and strength to the blade, an intermediate layer of a rubber-like cushioning material enclosing the core and an outer skin of metal electrodeposit enclosing the layer of cushioning material, presenting a continuous unbroken surface to the air-beating portions of the blade and defining the leading edge, the trailing edge and the tip of the blade and between the leading and trailing edges forming the upper and lower camber portions of the blade, said outer metal skin being of relatively thin cross section of material in its camber-forming portion to provide for flexibility and thus to provide for a hinge effect along the medial plane of the blade, and said metal skin in the parts forming the leading and trailing edges having a cross section of material greater than the portions which form the camber portions, thus providing more rigidity in the edges than in the camber portions, thereby to provide a relatively thin and more flexible cross section of material in that portion of the skin which forms the camber portions of the blade than in the edge forming portions.

References Cited in the file of this patent

UNITED STATES PATENTS

| Number | Name | Date |
|---|---|---|
| 1,248,151 | Mott | Nov. 27, 1917 |
| 1,261,141 | Luense | Apr. 2, 1918 |
| 1,282,265 | Merritt | Oct. 22, 1918 |
| 1,329,735 | Wicker | Feb. 3, 1920 |
| 1,335,846 | Merritt | Apr. 6, 1920 |
| 1,495,511 | Fitzgerald | May 27, 1924 |
| 1,624,575 | Biddle | Apr. 12, 1927 |
| 2,039,211 | Caldwell | Apr. 28, 1936 |
| 2,044,293 | Handler | June 16, 1936 |
| 2,057,924 | Smith | Oct. 20, 1936 |
| 2,191,813 | Brown | Feb. 27, 1940 |
| 2,231,750 | Damerel | Feb. 11, 1941 |
| 2,238,861 | Lind et al. | Apr. 15, 1941 |
| 2,276,262 | Caldwell | Mar. 10, 1942 |
| 2,320,998 | Beebe | June 8, 1943 |
| 2,400,649 | Larsen | May 21, 1946 |
| 2,423,700 | Hardy | July 8, 1947 |
| 2,423,755 | Calfee | July 8, 1947 |
| 2,462,615 | Dubpernell | Feb. 22, 1949 |
| 2,494,625 | Martin | Jan. 17, 1950 |
| 2,551,342 | Scholl | May 1, 1951 |
| 2,551,343 | Scholl | May 1, 1951 |
| 2,551,344 | Scholl | May 1, 1951 |
| 2,623,599 | Kearns | Dec. 30, 1952 |
| 2,627,404 | Bart | May 5, 1953 |

FOREIGN PATENTS

| Number | Country | Date |
|---|---|---|
| 541,615 | Great Britain | Dec. 3, 1941 |
| 674,727 | Germany | Apr. 21, 1939 |

OTHER REFERENCES

"Aviation Operations," pages 31 and 62, February 1950.

Concise Chemical and Technical Dictionary H. Bennett, Chemical Publishing Co., Brooklyn, N. Y., 1947, page 523.

Modern Electroplating, Special Volume, The Electrochemical Society, 1942, pp. 262–264.